Patented June 1, 1954

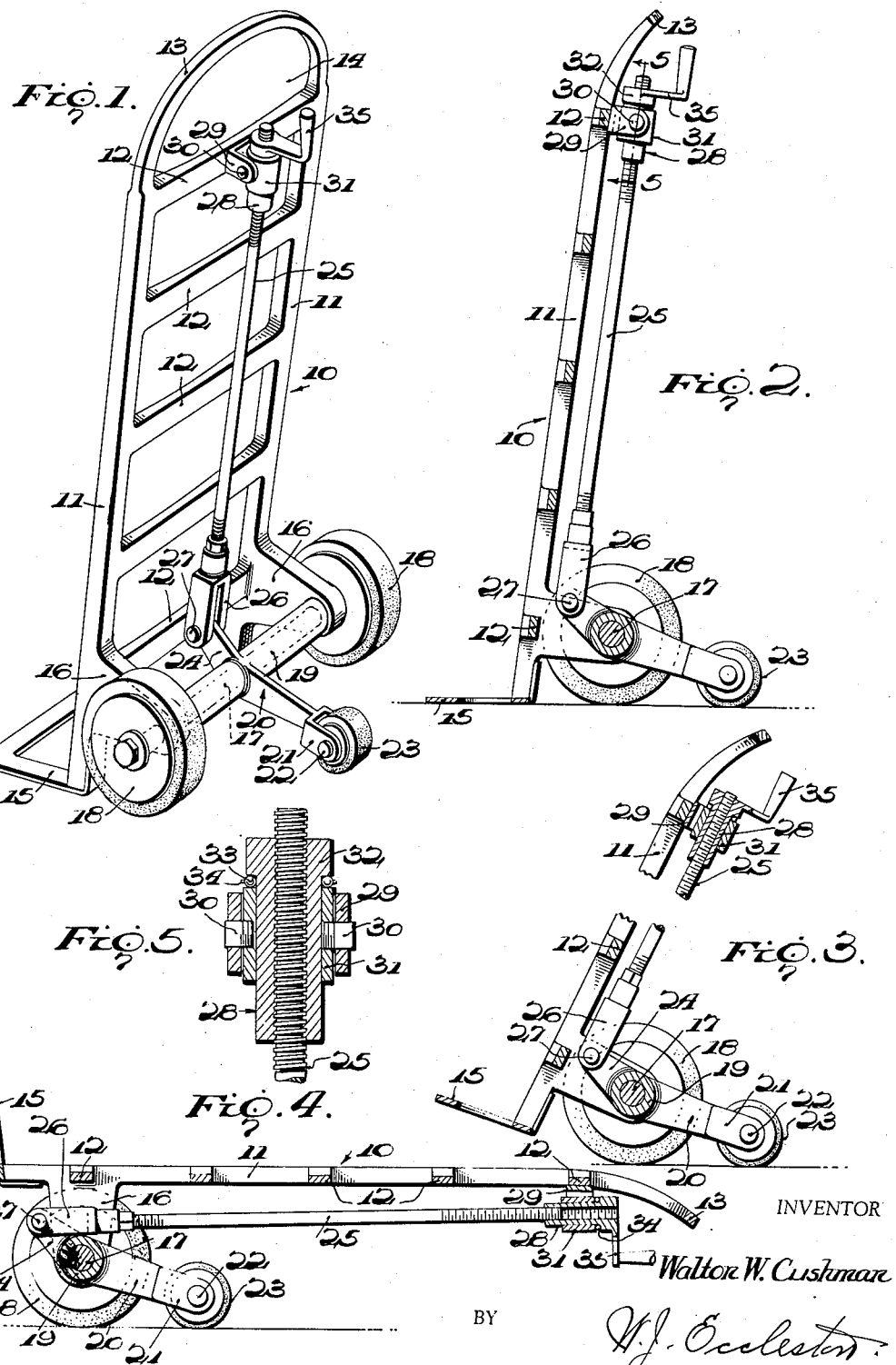

2,680,026

UNITED STATES PATENT OFFICE 2,680,026

HAND TRUCK WITH STABILIZING MEANS

Walton W. Cushman, Webb City, Mo., assignor to the United States of America as represented by the Secretary of the Army Application October 13, 1952, Serial No. 314,579

6 Claims. (Cl. 280—47.2)

(Granted under Title 35, U. S. Code (1952), sec. 266)

The invention described herein may be manufactured and used by or for the Government for governmental purposes, without the payment to me of any royalty thereon.

My invention relates to hand trucks of the type used for moving cartons, barrels, crates and the like.

In the past, efforts have been made to provide two-wheeled hand trucks with stabilizing means to increase the safe capacity of the trucks and to aid the operator in using the same without depending upon the sheer strength of the operator for balancing the load and raising and lowering the truck. Such stabilizing means have taken the form of adjustable third wheel attachments, arranged at the rear of the two-wheeled hand truck, but these attachments have not been entirely satisfactory due to their bulkiness, and the resulting interference with the feet and legs of the operator. Accordingly, it has occurred to me to provide stabilizing means for a two-wheeled hand truck which are more simplified and compact, and arranged so as to be out of the way of the operator's feet and legs in all normal adjusted positions of the hand truck.

Accordingly, it is a primary object of the present invention to provide stabilizer means for hand trucks which will greatly facilitate the handling of heavy loads in a safe and efficient manner, without interfering with the normal manipulation or use of the truck by the operator in a warehouse or the like.

A further object is to provide an adjustable stabilizing attachment for hand trucks and having parts arranged close to the main frame or body portion of the truck, in all adjusted positions, so as to be free from interference with the feet and legs of the operator.

A still further object of the invention is to provide a device of the above-mentioned character which is extremely sturdy and durable, easy to operate, and relatively inexpensive to manufacture, the device requiring substantially no changes in the basic conventional design of the two-wheeled hand truck.

Other objects and advantages of the invention will be apparent during the course of the following description.

In the accompanying drawings, forming a part of this application, and in which like numerals are employed to designate like parts throughout the same, Figure 1 is a perspective view of a hand truck equipped with the adjustable stabilizing means embodying my invention, Figure 2 is a central vertical section through the same, parts in elevation, Figure 3 is a further central vertical section through the hand truck, parts broken away and parts in elevation, the truck being shown in a different adjusted position, Figure 4 is a still further central vertical section through the truck, similar to Figure 2 but showing the truck in the fully lowered or horizontal position, and, Figure 5 is an enlarged fragmentary vertical section on line 5—5 of Figure 2.

In the drawings, where for the purpose of illustration is shown a preferred embodiment of the invention, the numeral 10 designates generally a main frame or body portion consisting of straight substantially parallel side members or bars 11, rigidly secured together by a plurality of spaced transverse cross bars or elements 12, preferably formed integral therewith, as shown. The top of the frame 10 is preferably provided with a transversely curved handle bar 13, prefreably having its ends integrally secured to the upper ends of the side bars 11, and extending above the uppermost cross bar 12 for forming a large opening 14.

A substantially flat lifting element or toe piece 15 is rigidly secured to the lower ends of the side bars 11, in a conventional manner, and this toe pieces is adapted to lie flat upon the floor when the hand truck is in the upright position, as shown in Figure 2. The toe piece 15 projects forwardly of the main frame 10, and is arranged at an angle of slightly more than 90° to the forward side of the main frame, as shown.

Axle supporting bearings or extensions 16 are rigidly secured to the rear sides of the bars 11 near and above the lower end of the truck, and preferably formed integral with the bars 11. The bearings 16 extend rearwardly of the main frame 10 and have aligned openings formed near their rear ends for receiving a transverse horizontal shaft or axle 17, having wheels 18 journaled upon its ends and disposed near the outer sides of the bearings 16 and side bars 11. As shown in Figure 2, the forward sides of the wheels 18 are substantially tangent to the rear side of the main frame 10, and the wheels engage the floor rearwardly of the toe piece 15 when the toe piece is lying flat upon the floor and the main frame 10 is in an upright or nearly vertical position. The construction thus far described constitutes that of a substantially conventional two-wheeled hand truck of the type used in warehouses and the like for transporting cartons, barrels, crates and the like.

My stabilizing means comprises a transverse sleeve or tube 19, freely rotatably mounted upon the axle 17 and having its ends substantially contacting the inner sides of the bearings 16. An arm or crank 20 is rigidly secured to the tube 19 at the longitudinal center of the same and extends rearwardly thereof for a substantial distance, and disposed generally horizontally, although inclined downwardly somewhat toward its rear end. A U-shaped connecting element or yoke 21 is preferably integrally secured to the rear end of the arm 20, and provided in its sides with aligned openings for receiving a transverse axle 22 of a relatively small stabilizing third wheel 23, journaled upon the axle 22 and arranged between the sides of the U-shaped yoke 21. The arm or crank 20 includes a relatively short forward extension or crank 24, preferably formed integral therewith and being inclined upwardly somewhat toward its forward end. The forward end of the extension 24 terminates slightly rearwardly of the main frame 10 so as to clear the lowermost cross bar 12 when the arm 20 swings vertically during the operation of the stabilizing means. The arm 20 and third wheel 23 are arranged at the transverse center of the hand truck, and the arm is transversely narrow and spaced from the wheels 18, so as not to interfere with the feet of the operator.

A longitudinally shiftable screw shaft 25 is arranged close to the rear side of the main frame 10 at the transverse center of the main frame and is parallel to the side bars 11 when the truck is in the upright position of Figure 2. The screw shaft 25 has a U-shaped connecting element or yoke 26 rigidly secured to its lower end, as shown, and the sides of the yoke 26 receive between them the forward extension 24 of the arm 20. The extension 24 is pivotally secured to the yoke 26 by means of a pin or bolt 27. The connection between the yoke 26 and arm extension 24 prevents the screw shaft 25 from turning on its longitudinal axis but allows the screw shaft to be shifted longitudinally or axially in a manner to be described.

The upper end of the screw shaft 25 extends above the uppermost cross bar 12, as shown, and has an internally screw-threaded sleeve or nut 28 mounted thereon and having screw-threaded engagement therewith. A rearwardly projecting U-shaped bracket 29 is suitably rigidly secured to the back of the uppermost cross bar 12, at the transverse center of the frame 10 and the bracket 29 has aligned openings in its sides pivotally receiving short trunnions 30, rigidly secured to an intermediate bearing sleeve 31, arranged between the sides of the bracket 29 and slidably receiving within its bore the internally screw-threaded sleeve 28. The sleeve or nut 28 is provided at its top with an enlargement or head 32 integral therewith forming a lateral shoulder 33, arranged in axially spaced opposed relation to the upper end of the intermediate sleeve 31, Figure 5. Ball bearings 34 are arranged between the shoulder 33 and upper end of the sleeve 31 to receive the thrust load produced upon the nut 28, and providing a substantially frictionless connection between the nut 28 and intermediate sleeve 31. A hand crank 35 is rigidly secured to the head 32 of nut 28, and is preferably integral therewith. The crank 35 is positioned slightly above the uppermost cross bar 12, and when turned the crank may enter the space 14 above the uppermost cross bar and will not interfere with any part of the main frame 10.

In use, the hand truck may be adjusted to the upright position of Figure 2, wherein the toe piece 15 lies flat upon the floor for receiving the load. In this position, the screw shaft 25 is parallel with the main frame 10 and arranged close to the rear side of the main frame as shown. The arm 20 is now generally perpendicular to the main frame 10 and the wheels 18 and stabilizer wheel 23 are all engaging the floor.

After the load is placed upon the truck, the crank 35 is turned for shifting the screw shaft 25 longitudinally downwardly and elevating or retracting the stabilizer wheel 23, the truck pivoting rearwardly about the main wheels 18 to the desired rearwardly inclined position, such as the position shown in Figure 3. In this or any like intermediate position, the screw shaft 25 is still substantially parallel to the main frame 10, although the lowermost end of the screw shaft is now swung slightly inwardly toward the main frame 10 due to the arc through which the arm extension 24 must travel. This slight inward movement of the lower end of the screw shaft 25 is allowed by the swiveled connection of the intermediate sleeve 31 and yoke 29.

When it is desired to lower the truck to the horizontal position of Figure 4, it is merely necessary to continue turning the crank 35 for shifting the screw shaft 25 downwardly, and the arm 20 will continue to rotate counterclockwise, Figures 3 and 4, until the stabilizer wheel 23 is fully retracted and disposed rearwardly of the main wheels 18, Figure 4. In such position, the arm extension 24 now projects forwardly of the axle 17 and the lower end of the screw shaft 25 is spaced slightly further from the main frame 10 than is the upper end of the screw shaft adjacent to the crank 35, Figure 4. However, as shown in the drawings, the screw shaft 25 remains close to the frame 10 and substantially parallel therewith in all adjusted positions of the truck.

With the above described arrangement, the safe load carrying capacity of the hand truck is greatly increased, and the truck is easily handled without liability of injury to the operator and without requiring a great deal of physical effort on the part of the operator. I again wish to emphasize that the stabilizing means of the hand truck are arranged so as not to interfere in the slightest with the legs and feet of the operator, who may wish to shift or "jockey" the truck by engagement of his foot with one of the wheels 18. The screw shaft 25 in all adjusted positions of the hand truck is close to the main frame 10 and well out of the way of the knees of the operator.

It is to be understood that the form of the invention, herewith shown and described is to be taken as a preferred example of the same, and that various changes in the shape, size and arrangement of parts may be resorted to, without departing from the spirit of the invention or scope of the subjoined claims.

Having thus described the invention, I claim:

1. A hand truck comprising a body portion having upper and lower ends, a transverse axle mounted upon the body portion near its lower end and spaced rearwardly thereof, supporting wheels mounted upon the axle, a sleeve rotatably mounted upon the axle between the supporting wheels, a vertically swingable arm secured to the sleeve and extending forwardly and rearwardly thereof, a stabilizing wheel journaled upon said arm near the trailing end rotatable screw shaft arranged close to the rear side of the body portion and substantially parallel therewith and having its lower end pivotally secured to the vertically swingable arm forwardly of said sleeve, the upper end of the screw shaft extending near the upper end of said body portion, a driving nut having screw-threaded engagement with the screw shaft near its upper end and including a part forming a crank, an intermediate sleeve rotatably receiving the driving nut and having trunnions, and a bracket secured to the rear side of the body portion and pivotally connected with said trunnions.

2. A hand truck comprising a generally flat body portion having handle-forming means at one end thereof, bearing extensions secured to the body portion near its other end and extending rearwardly of the body portion, a transverse axle mounted upon the bearing extensions, supporting wheels journaled upon the axle outwardly of the bearing extensions, a tube rotatably mounted upon the axle between the bearing extensions and having its ends substantially contacting the inner sides of the bearing extensions, a single vertically swingable arm secured to the tube near the longitudinal center thereof and substantially midway between the bearing extensions, the arm extending forwardly and rearwardly of the tube and being generally horizontal when the body portion is upright, a stabilizer wheel journaled upon the rear end of the arm for engagement with the ground, a non-rotatable element pivotally secured to the vertically swingable arm forwardly of said axle, a longitudinally shiftable screw shaft having one end secured to said non-rotatable element and extending longitudinally of said substantially flat body portion and arranged close to the body portion and substantially parallel therewith, a rotatable driving nut having screw-threaded engagement with the screw shaft and including a part forming a crank, and a bearing rotatably connected with the driving nut and pivotally secured to said body portion a substantial distance above said bearing extensions.

3. A hand truck comprising a generally flat body portion having upper and lower ends, bearings secured to the rear side of the body portion near and above its lower end and projecting rearwardly of the body portion, a transverse axle mounted upon the bearings and extending between the same, supporting wheels carried by the axle outwardly of the bearings, a sleeve journaled upon the axle between the bearings, an arm secured to the sleeve near the transverse center of the body portion and extending forwardly and rearwardly of the sleeve and provided near its trailing end with a ground-engaging part, the arm being disposed generally horizontally when the body portion is substantially upright, the forward end of the arm being arranged close to the rear side of the body portion and adapted to swing in an arc without contacting the body portion, a longitudinally shiftable non-rotatable screw shaft arranged close to the rear side of the body portion at substantially the transverse center thereof and extending longitudinally of the body portion and substantially parallel therewith, pivot means connecting the lower end of the screw shaft with the forward end of said arm, bearing means secured to the rear side of the body portion a substantial distance above the lower end of the body portion, and a screw-threaded driving nut journaled within said bearing means and having screw-threaded engagement with the screw shaft and including a part forming a crank to turn the driving nut.

4. A hand truck comprising a body portion having an upper end adapted to serve as a handle and a lower end, a member secured to the lower end of the body portion and extending forwardly thereof for engagement beneath an article to be lifted, supporting wheels journaled upon the body portion near the lower end of the same and adjacent to the rear side of the body portion, a vertically swingable arm pivotally connected with the body portion between said wheels near the lower end of the body portion and adjacent to the rear side of the body portion, said arm being adapted to extend rearwardly of said wheels and forwardly of their points of connection with the body portion, a stabilizer wheel journaled upon the rear end of said arm, a longitudinally shiftable shaft arranged close to the rear side of the body portion and substantially parallel therewith and extending throughout the major portion of the length of the body portion between its upper and lower ends and having its upper end screw-threaded, a rotatable driving nut mounted upon said screw-threaded upper end of the shaft and having screw-threaded engagement therewith, the lower end of said shaft being pivotally secured to said arm forwardly of its pivotal connection with the body portion and forwardly of the points of attachment of the supporting wheels to the body portion, and a bearing device rotatably holding said nut and connected with the body portion near the upper end of the same.

5. A hand truck comprising a body portion having an upper end adapted to serve as a handle and a lower end, a member secured to the lower end of the body portion and extending forwardly thereof for engagement beneath an article to be lifted, supporting wheels journaled upon the body portion near the lower end of the same and adjacent to the rear side of the body portion, a vertically swingable arm pivotally connected with the body portion between said wheels near the lower end of the body portion and adjacent to the rear side of the body portion, said arm being adapted to extend rearwardly of said wheels and forwardly of their points of connection with the body portion, a stabilizer wheel journaled upon the rear end of said arm, a longitudinally shiftable member arranged close to the rear side of the body portion and substantially parallel therewith and extending throughout the major portion of the length of the body portion between its upper and lower ends, the lower end of the member being pivotally secured to said arm forwardly of its pivotal connection with the body portion and forwardly of the points of attachment of the supporting wheels to the body portion, and movable means connected with said member and body portion near the upper end of said member for effecting longitudinal movement of said member to swing said arm upon its pivot.

6. A hand truck comprising a body portion having an upper end adapted to serve as a handle and a lower end, a member secured to the lower end of the body portion and extending forwardly thereof for engagement beneath an article to be lifted, supporting wheels journaled upon the body portion near the lower end of the same and adjacent to the rear side of the body portion, a vertically swingable arm pivotally connected with the body portion between said wheels near the lower end of the body portion and adjacent to the rear side of the body portion, said arm being adapted to extend rearwardly of said wheels and forwardly of their points of connection with the body portion, a stabilizer wheel journaled upon the rear end of said arm, a supporting member pivotally secured to the rear side of the body portion near the upper end of the same, longitudinally extensible connecting means connected with the supporting member and arranged close to the rear side of the body portion and substantially parallel thereto and extending throughout the major portion of the length of the body portion between its upper and lower ends, said means being pivotally connected with the arm forwardly of the pivotal connection of the arm to the body portion and forwardly of the points of attachment of said wheels to the body portion, and manually operable means connected with said extensible connecting means for effecting extension of the latter and causing said arm to turn upon its pivot.

References Cited in the file of this patent

UNITED STATES PATENTS

| Number | Name | Date |
|---|---|---|
| 627,284 | Walker | June 20, 1899 |
| 1,852,100 | Ballou | Apr. 5, 1932 |
| 2,598,168 | Hooz et al. | May 27, 1952 |
| 2,599,717 | Menzies | June 10, 1952 |

FOREIGN PATENTS

| Number | Country | Date |
|---|---|---|
| 266,260 | Switzerland | Apr. 17, 1950 |
| 828,164 | Germany | Jan. 17, 1952 |